(12) United States Patent
Bell

(10) Patent No.: US 7,445,222 B2
(45) Date of Patent: Nov. 4, 2008

(54) MULTI-PURPOSE TOW BAR FOR A TRAILER

(75) Inventor: Robert Bell, Guelph (CA)

(73) Assignee: PI Manufacturing, Guelph, Ontario (CA)

( * ) Notice: Subject to any disclaimer, the term of this patent is extended or adjusted under 35 U.S.C. 154(b) by 41 days.

(21) Appl. No.: 10/565,237

(22) PCT Filed: Jul. 21, 2004

(86) PCT No.: PCT/CA2004/001058

§ 371 (c)(1),
(2), (4) Date: Jan. 19, 2006

(87) PCT Pub. No.: WO2005/007485

PCT Pub. Date: Jan. 27, 2005

(65) Prior Publication Data

US 2007/0063474 A1    Mar. 22, 2007

(30) Foreign Application Priority Data

Jul. 21, 2003    (CA)    ................................. 2435615

(51) Int. Cl.
*B62K 27/00*    (2006.01)
(52) U.S. Cl. ........................ 280/204; 280/292
(58) Field of Classification Search .............. 280/204, 280/292, 645, 656
See application file for complete search history.

(56) References Cited

U.S. PATENT DOCUMENTS

| | | | |
|---|---|---|---|
| 2,629,611 A * | 2/1953 | Covington | .................. 280/292 |
| 3,792,875 A * | 2/1974 | Paden | .......................... 280/204 |
| 4,371,184 A * | 2/1983 | Henden et al. | ............... 280/204 |
| 4,729,574 A | 3/1988 | Tipke | |
| 4,740,008 A | 4/1988 | Johnson | |
| 5,215,318 A * | 6/1993 | Capraro | ...................... 280/1.5 |
| 5,267,744 A | 12/1993 | Berry et al. | |
| 5,308,096 A * | 5/1994 | Smith | ......................... 280/204 |
| 5,454,577 A * | 10/1995 | Bell | ........................... 280/204 |
| 5,611,560 A | 3/1997 | Thimmig | |
| 5,921,571 A | 7/1999 | Bell | |
| 6,056,306 A | 5/2000 | Rust et al. | |
| 6,155,582 A * | 12/2000 | Bourbeau | ................... 280/204 |
| 6,193,252 B1 | 2/2001 | Lin | |
| 6,705,628 B2 * | 3/2004 | Kahmann | ................... 280/204 |
| 6,959,938 B1 * | 11/2005 | Liu | ............................ 280/204 |

FOREIGN PATENT DOCUMENTS

DE    199 19 175 A1    11/1999

* cited by examiner

*Primary Examiner*—Lesley D. Morris
*Assistant Examiner*—Maurice Williams
(74) *Attorney, Agent, or Firm*—Dimock Stratton LLP (firm); Mark B. Eisen

(57) ABSTRACT

A multi-purpose tow bar for a trailer and a trailer having a multi-purpose tow bar. In a towing position the tow bar couples the trailer to a moving vehicle such as a bicycle. In a stabilizing position the tow bar supports a stabilizing wheel extending forwardly of the trailer frame, converting the trailer into a self-supporting vehicle such as a stroller or jogger. The tow bar is reversible, comprising first and second end portions which in the preferred embodiment respectively extend from one another at an angle.

20 Claims, 8 Drawing Sheets

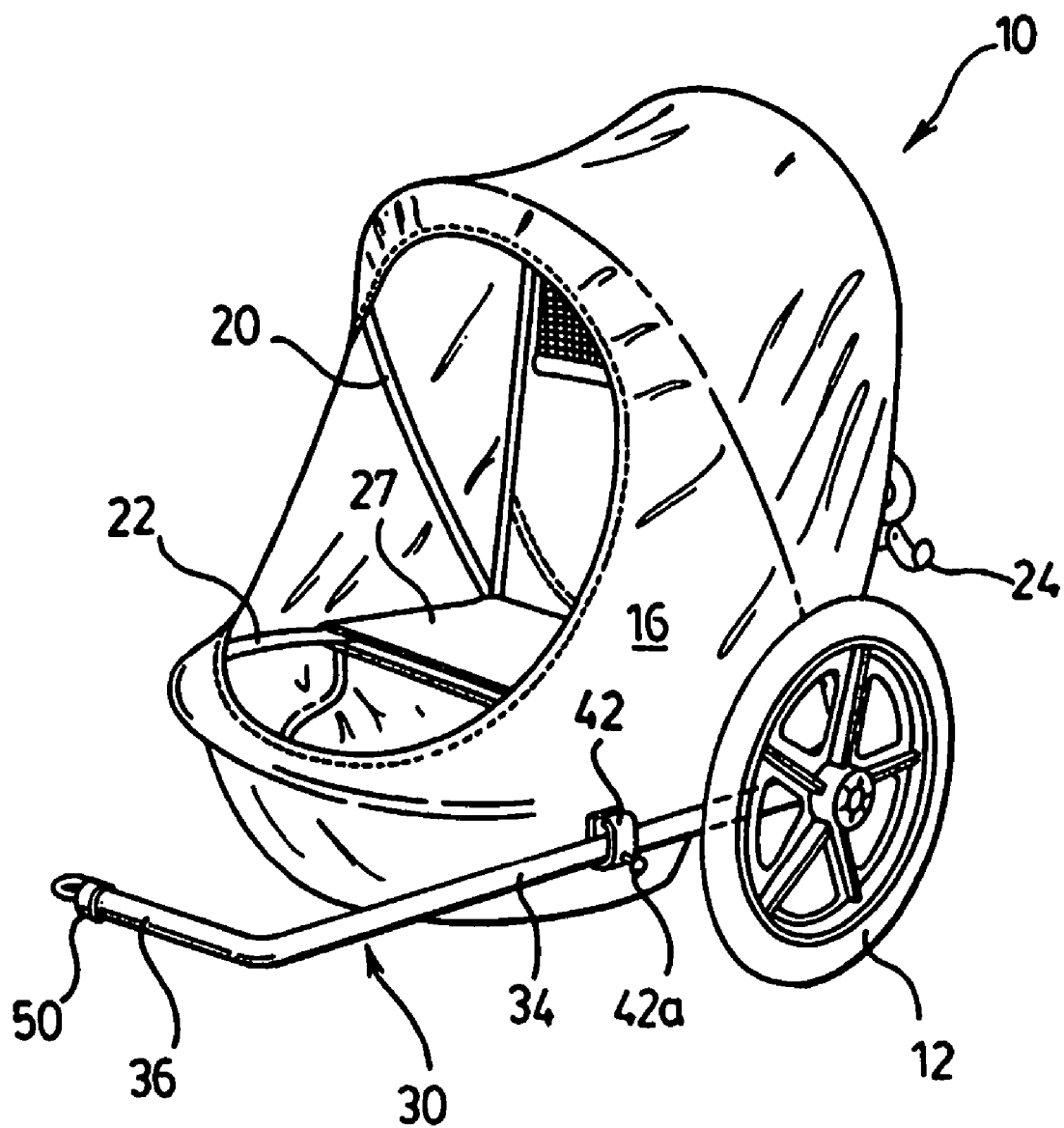

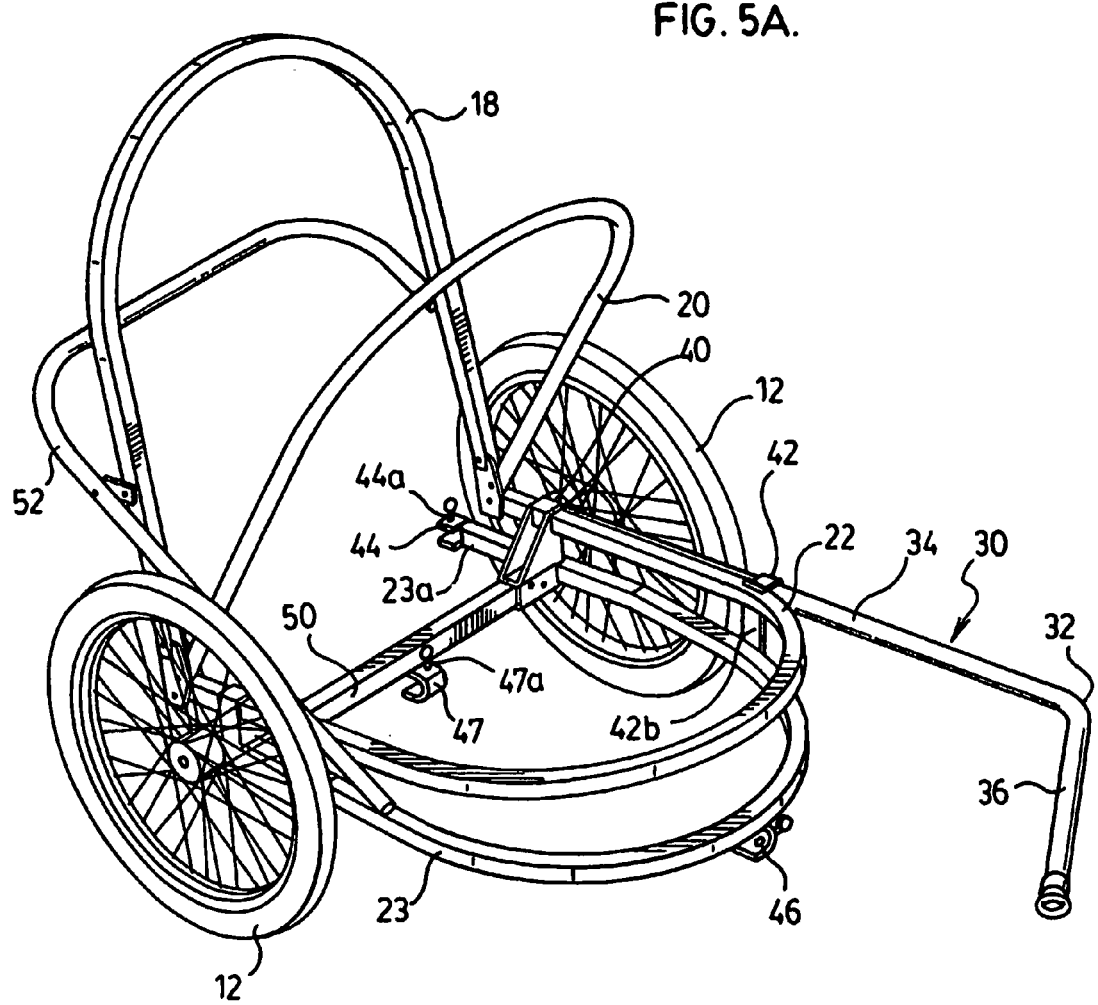

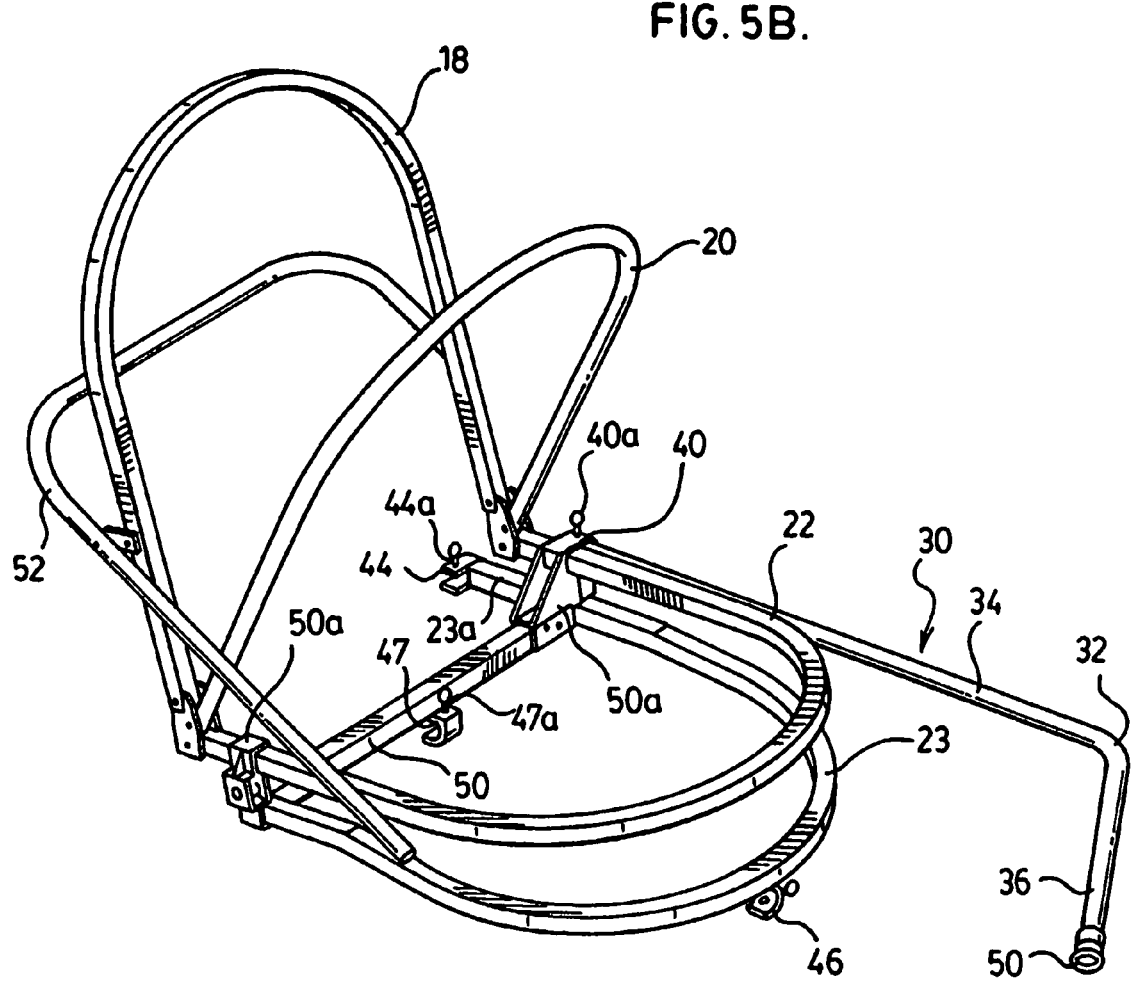

MULTI-PURPOSE TOW BAR FOR A TRAILER

FIELD OF THE INVENTION

The present invention relates to a trailer for a moving vehicle such as a bicycle. In particular, this invention relates to a multi-purpose tow bar for a trailer which serves as a tow bar in one position, and in a second position functions as a support for a third wheel to render the trailer self-supporting.

BACKGROUND OF THE INVENTION

Trailers for use with moving vehicles such as bicycles are known in the art. Such trailers can be used for carrying small children and other belongings. It is important that the trailer be easy to open and close and that it fold in a compact way so that it can be readily stored or moved in the trunk or confines of another vehicle, such as a car.

An example of such a trailer is shown and described in U.S. Pat. No. 5,921,571 issued Jul. 13, 1999 to Bell, which is incorporated herein by reference. This patent teaches a trailer having a folding frame which is readily collapsible and easy to manufacture. The trailer has a pair of wheels and the frame is provided with a tow bar, which is movable from a first position extending forwardly of the frame to thereby be coupled to a bicycle (or other vehicle) for towing, to a second position extending rearwardly of the frame where it serves as a handle so that the trailer can be pushed from behind, for example by a runner.

Such trailers have most of the components of a self-supporting vehicle, for example a so-called "jogger" which can be driven like a high speed stroller by a person running or jogging. However, like a conventional trailer, this trailer is supported on only two wheels and therefore does not have the ability to be self-supporting. In the trailer mode the front end of the trailer is supported by the towing vehicle which holds the free end of the tow bar, and thus the front of the trailer frame, at an elevated position. When pushing the trailer, the runner must apply a constant downward force to the handle (i.e. the tow bar in the handle position) in order to maintain the front of the trailer frame at an elevated position, and manually maintain the handle at a relatively stable attitude for the comfort of the occupant. This can interfere with the proper running or jogging form and makes the trailer more difficult to control.

It is possible to attach a third stabilizing wheel to the frame, to make the trailer self-supporting and thereby convert it to a stroller or jogger-type vehicle. However, one of the benefits of such a trailer—and particularly the trailer described in U.S. Pat. No. 5,921,571—is that the trailer is compact and easily transportable. Thus, it is counterproductive to require the user to tote substantial additional or loose parts, and tools for their assembly and installation, in order to have the ability to convert the trailer to a stroller or jogger.

It would accordingly be advantageous to be able to readily convert the trailer into a self-supporting vehicle such as a stroller or jogger, without having to tote excessive parts and without requiring tools or any particular level of mechanical skill.

SUMMARY OF THE INVENTION

The present invention provides a multi-purpose tow bar for a trailer and a trailer having a multi-purpose tow bar. In a towing position the tow bar couples the trailer to a moving vehicle such as a bicycle. In a stabilizing position the tow bar supports a third wheel extending forwardly of the trailer frame, converting the trailer into a self-supporting vehicle such as a stroller or jogger.

According to the invention the tow bar is reversible, comprising first and second end portions which respectively extend from an intermediate portion. Thus, the end portion that couples to the trailer in the towing position becomes the end portion that supports the wheel in the stabilizing position; likewise, the end portion that couples to the towing vehicle in the towing position becomes the end portion that couples to the frame in the stabilizing position. However, while in the towing position the tow bar is positioned along one side of the trailer so that the hitch approaches the rear wheel of a bicycle from the side, when supporting a wheel the tow bar is positioned generally centrally beneath the trailer. The reversible tow bar of the invention is thus configured to accommodate both functions.

In the preferred embodiment the first and second end portions extend from one another at an angle. In this embodiment the first and second end portions thus extend from one another in a configuration which allows the tow bar to be affixed to the folding frame at two points for a stable, rigid interface with the collapsible frame whether serving as a wheel support or as a tow bar. Because of the angle between the first and second ends and the points at which the bar is affixed to the frame, in the towing position the end of the tow bar that couples to the towing vehicle is generally laterally centred relative to the trailer frame with the longer portion of the bar aligned with a side of the frame to provide a suitable approach angle for the hitch; while in the stabilizing position the tow bar supports a third wheel generally laterally centred relative to the trailer frame and the longer portion of the bar is aligned generally with the centre of the frame for balanced support.

The present invention thus provides a multi-purpose tow bar for a trailer having a frame mounted on a pair of primary wheels, the tow bar comprising: a first end portion for coupling to the frame in a towing position and for supporting a stabilizing wheel in a stabilizing position, and a second end portion for coupling to a moving vehicle in a towing position and for coupling to the frame in a stabilizing position, extending from the first portion at an angle, whereby to change from the towing position to the stabilizing position, a direction of the tow bar is reversed such that in the towing position the second end portion extends forwardly of the frame from one side toward a lateral centreline of the frame for coupling to a towing vehicle at a level which suspends a front end of the frame, and in a stabilizing position the second end portion is coupled to the frame and the first end portion extends forwardly of the frame for supporting the stabilizing wheel.

The present invention further provides a trailer adapted to be supported by a pair of primary wheels in a towing position and by the pair of primary wheels and a stabilizing wheel in a stabilizing position, comprising: a multi-purpose tow bar, comprising a first end portion for coupling to the frame in a towing position and for supporting a stabilizing wheel in a stabilizing position, and a second end portion for coupling to a moving vehicle in a towing position and for coupling to the frame in a towing position, extending from the intermediate portion at an angle; and a frame mounted on the pair of primary wheels, having, for affixing the tow bar in a towing position, a first point of attachment adjacent to one of the primary wheels and a second point of attachment generally disposed at a lateral centre of the frame, such that a substantial portion of the first end portion extends generally along a lateral centreline of the frame, and for affixing the tow bar in a stabilizing position, a third point of attachment adjacent to one of the primary wheels and a fourth point of attachment generally disposed near a front end of one side of the frame, such that the second end portion approaches a lateral centre-line of the frame from one side, whereby to change from the towing position to the stabilizing position, a direction of the tow bar is reversed and the tow bar is removed from the first and second points of attachment and affixed to the third and fourth points of attachment.

The present invention further provides a kit of parts for a trailer having a frame mounted on a pair of primary wheels, comprising: a multi-purpose tow bar, comprising a first end portion for coupling to the frame in a towing position and for supporting a stabilizing wheel in a stabilizing position, and a second end portion for coupling to a moving vehicle in a towing position and for coupling to the frame in a towing position, extending from the intermediate portion at an angle; and for affixing the tow bar in a towing position, a first coupler for mounting adjacent to one of the primary wheels and a second coupler for mounting generally at a lateral centre of the frame, and for affixing the tow bar in a stabilizing position, a third coupler for mounting adjacent to one of the primary wheels and a fourth coupler for mounting generally near a front end of one side of the frame, whereby a position of the tow bar can be changed from the towing position to the stabilizing position by reversing the tow bar, removing the tow bar from the first and second couplers and affixing the tow bar to the third and fourth couplers.

BRIEF DESCRIPTION OF THE DRAWINGS

In drawings which illustrate a preferred embodiment of the invention by way of example only.

FIG. 2A is a perspective view of a trailer embodying the tow bar of FIG. 1, with the tow bar in a towing mode.

FIG. 5A is a perspective view of the frame in the trailer of FIG. 2A from the side opposite FIG. 4A.

FIG. 5B is a perspective view of the frame of FIG. 5A with the main wheels removed for illustrative purposes.

DETAILED DESCRIPTION OF THE PREFERRED EMBODIMENTS

Figure 1A:
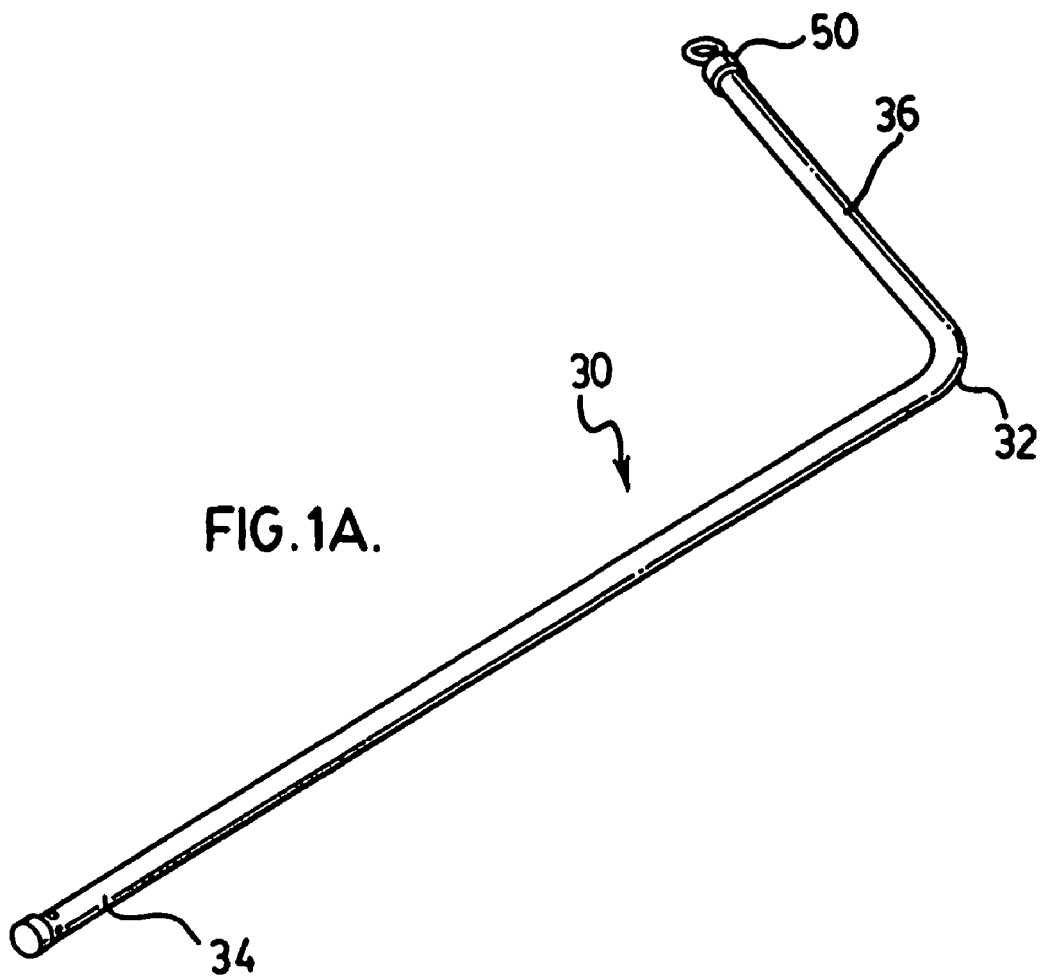
FIG. 1A is a perspective view of a tow bar according to the invention.
Figure 1B:
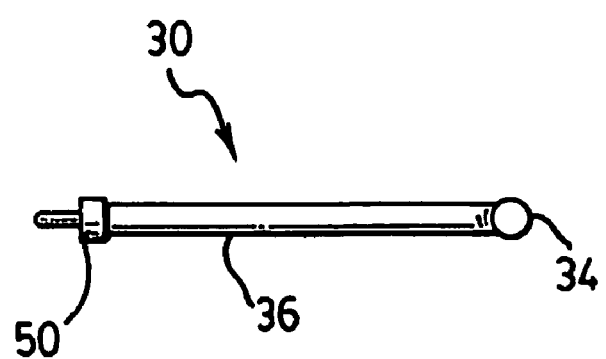
FIG. 1B is an end elevation of a tow bar according to the invention.

FIGS. 1A and 1B illustrate a tow bar 30 according to a preferred embodiment of the invention. The tow bar 30 comprises a first end portion 34 for coupling to the frame of the trailer 10 in a towing position, and a second end portion 36 for coupling to a moving vehicle (for example a bicycle, not shown) in a towing position. The second end portion 36 extends from the first end portion 34 at a bend 32 forming an angle which will vary depending upon the configuration of the trailer frame and the positioning of the various couplers (described below) that hold the tow bar 30. In a typical case the first end portion 34 will be substantially longer than the second end portion 36, again depending upon the configuration of the trailer frame.

Figure 2B:
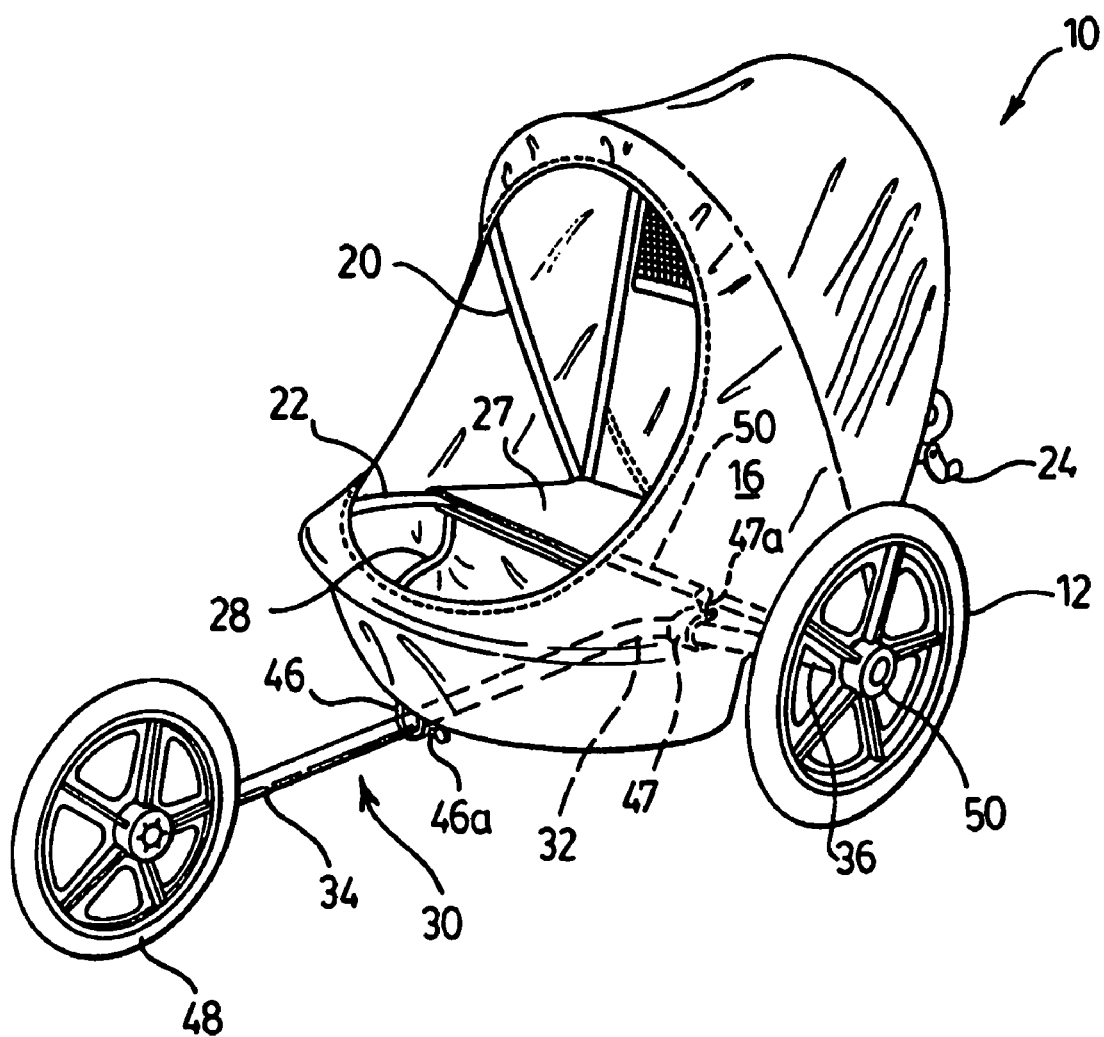
FIG. 2B is a perspective view of a trailer embodying the tow bar of FIG. 1, with the tow bar in a stabilizing mode.
Figure 3A:
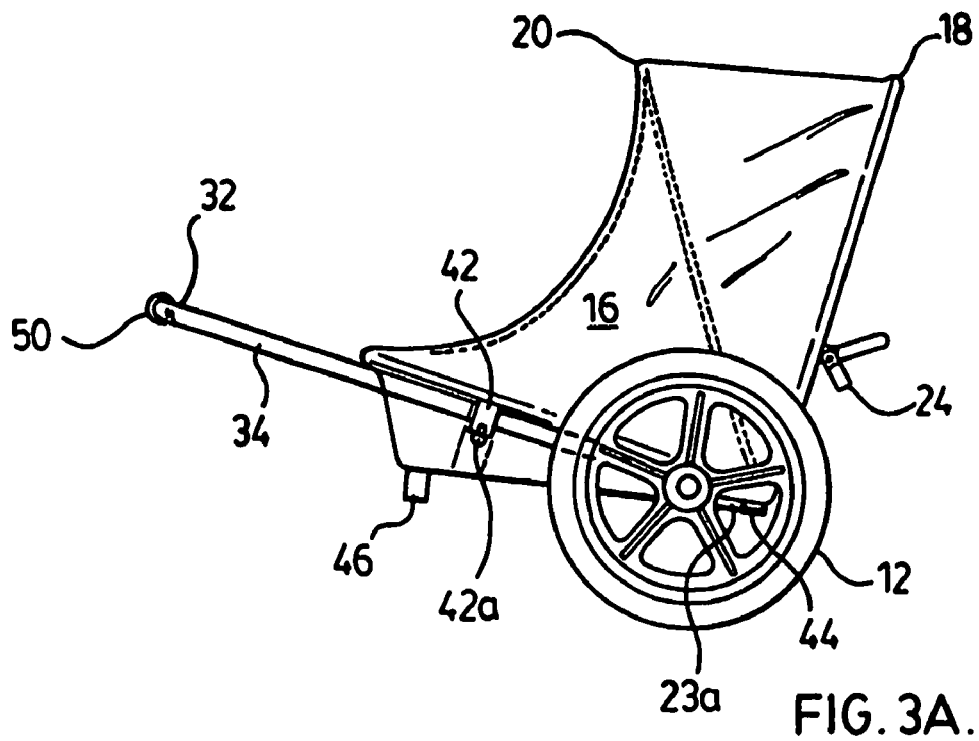
FIG. 3A is a side elevation of the trailer of FIG. 2A.
Figure 3B:
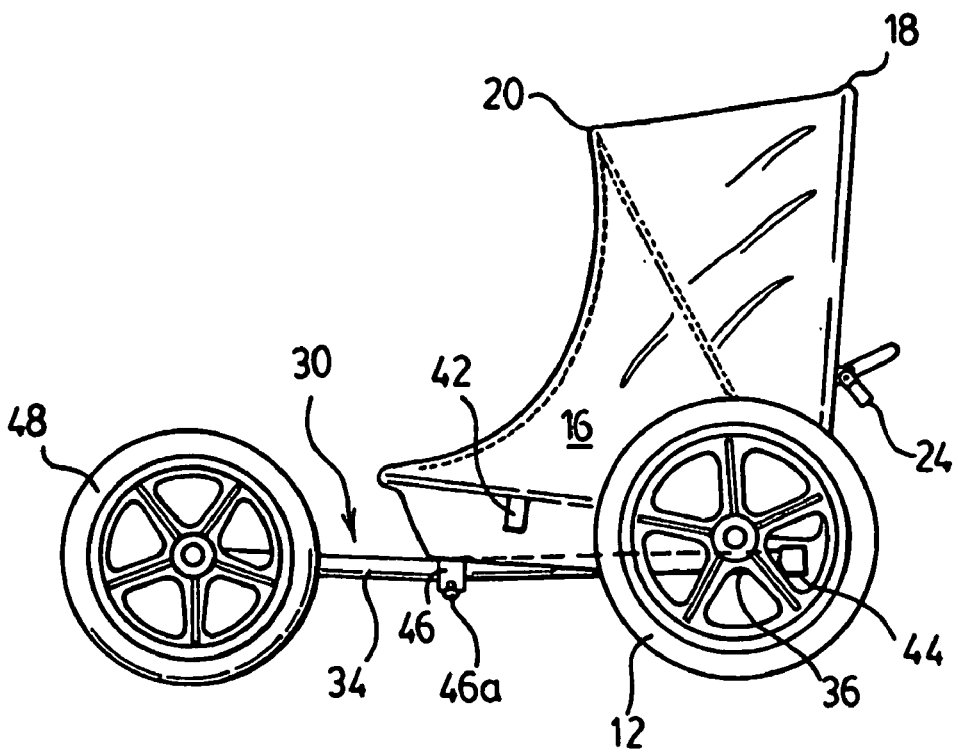
FIG. 3B is a side elevation of the trailer of FIG. 2B.

FIGS. 2 to 4 illustrate a trailer in association with which the tow bar 30 of FIG. 1 may be used. The trailer illustrated is essentially that shown and described in U.S. Pat. No. 5,421,571 issued Jul. 13, 1999 to Bell, which is incorporated herein by reference. It will be appreciated that the tow bar 30 of the invention can be used with other types of trailers, collapsible or otherwise, and the invention is not intended to be restricted to the particular embodiment shown.

The trailer 10 comprises three basic frame members: a rear frame 18, a medial frame 20 and a chassis 22. The chassis 22 supports the axle 50 on each side of the trailer 10, via plastic axle mounts 50a, on which are respectively mounted wheels 12 providing primary support for the trailer 10. The a rear frame 18 and medial frame 20, as well as a boot bar 23, all provide support for a fabric covering which assists in maintaining the frame in the erected condition and provides a seat 27 for the occupant of the vehicle, as described in detail in U.S. Pat. No. 5,421,571. In the embodiment shown the a rear frame 18 and medial frame 20 are hinged to the chassis 22 at the rear of the trailer 10, and the boot bar 23 is affixed to the chassis 22 by plastic axle mounts 50a.

Figure 4A:
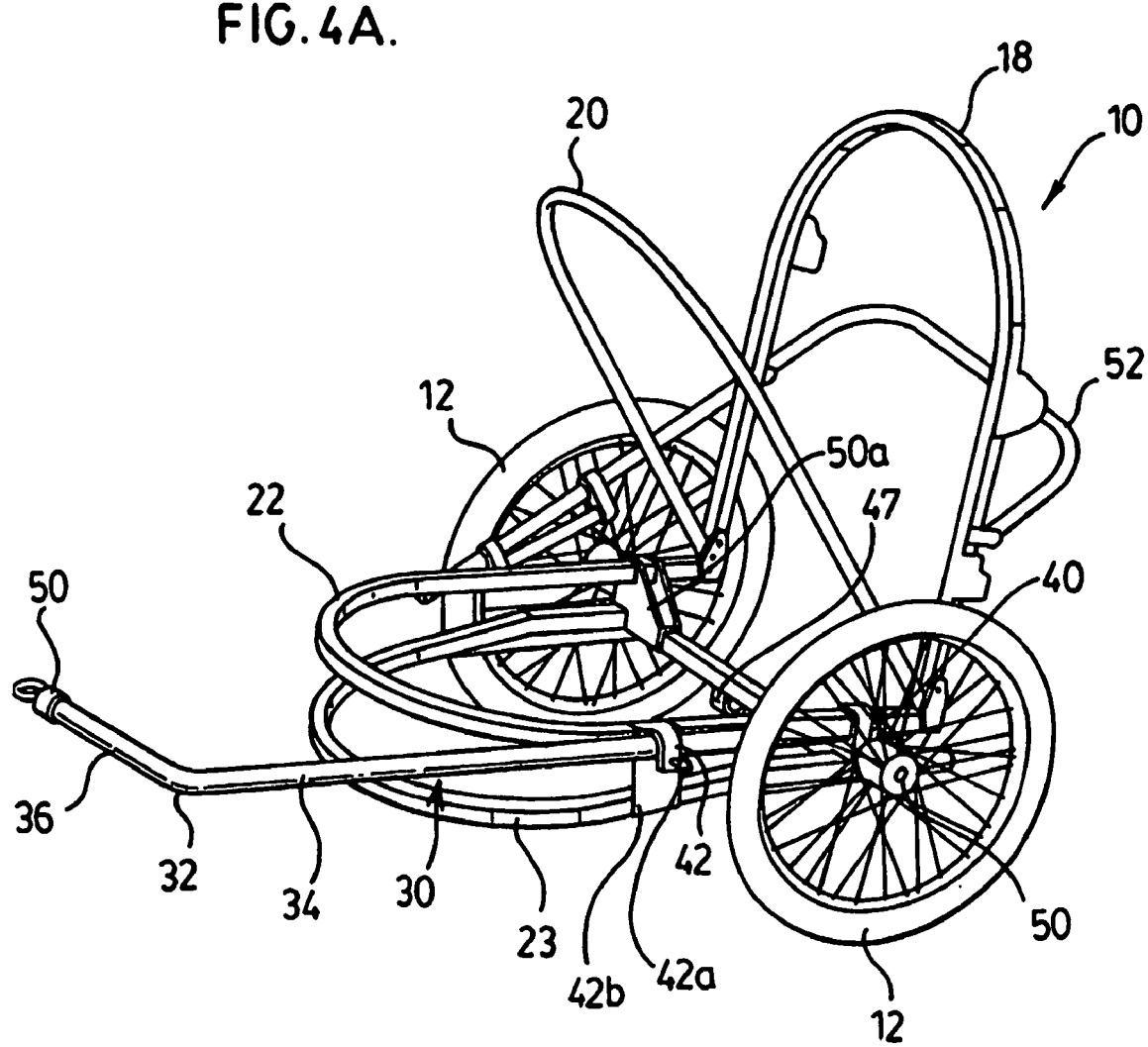
FIG. 4A is a perspective view of the frame in the trailer of FIG. 2A.

The improvement herein comprises a multi-purpose tow-bar 30. In the towing position, shown in FIGS. 2A, 3A and 4A, the first end portion 34 is coupled to the frame of the trailer 10 adjacent to and forwardly one of the primary wheels 12 by a first coupler at a first point of attachment, as best seen in FIGS. 4A and 5B. The first end portion 34 may be coupled by any suitable means, preferably via a plastic bracket 40 with a receptacle for receiving the end of the tow bar 30, with a removable pin 40a to releasably secure the end of the tow bar 30 to the bracket 40. Preferably the bracket 40 is formed integrally into axle mount 50a as shown, however bracket 40 may alternatively be a separate coupler such as a bracket. The first end portion 34 is further coupled to the chassis 22 at a second point of attachment forwardly of the wheels 12, via retaining bracket 42 and releasable pin 42a, for example anchored to a brace 42b extending between the chassis 22 and the boot bar 23, to rigidly couple the tow bar 30 to the frame of the trailer 10. In this fashion, the second end portion 36 of the tow bar 30 extends forwardly of the trailer 10 at a height which allows the trailer 10 to assume the desired attitude when the tow hitch 50 at the end of the second end portion 36 is coupled to a towing vehicle (for example a bicycle, not shown); and is angled toward the lateral centre of the trailer 10, so that the towing force is applied generally along an axis extending through the lateral centre of the trailer 10. Preferably the bracket 42 at the second point of attachment is as far forward of the bracket 40 at the first point of attachment as possible, to maximize the leverage of the 10 tow bar 30 on the trailer 10.

Because of the configuration of the tow bar 30, and in particular the angle of the first end portion 34 relative to the second end portion 36, the first end portion 34 can be coupled to the trailer 10 at two points of connection along the frame, while allowing the second end portion 36 approaches a towing vehicle such as a bicycle (not shown) from the side and thereby does not interfere with the free rotation of the rear wheel of the bicycle.

Figure 4B:
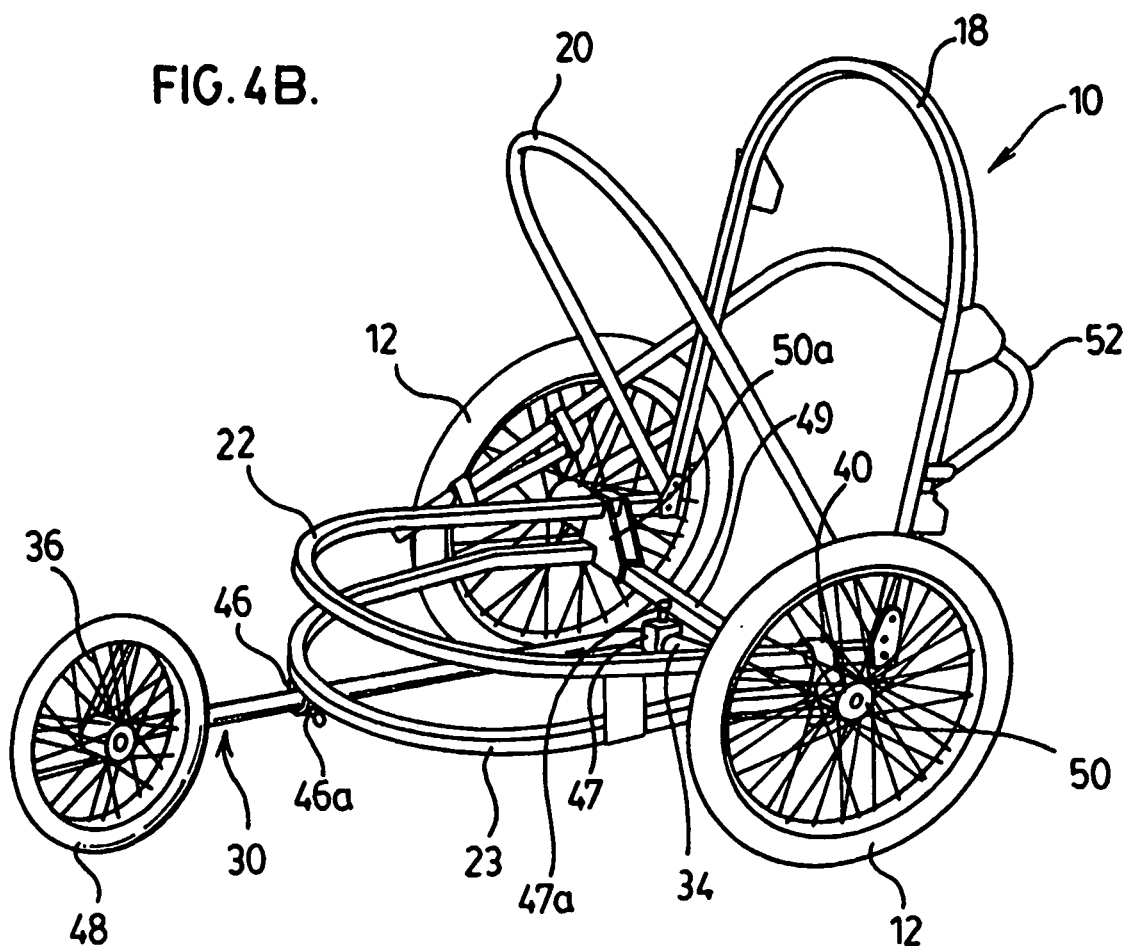
FIG. 4B is a perspective view of the frame in the trailer of FIG. 2B.

In the stabilizing position, for example for use of the trailer 10 as a jogger, shown in FIGS. 2B, 3B, 4B, 5A and 5B, the second end portion 36 of the tow bar 30 is coupled to the frame of the trailer 10. In this orientation the tow hitch 50 is coupled to the trailer 10 at a third point of attachment adjacent to and rearward of one of the primary wheels 12, for example via bracket 44 with a receptacle for receiving the tow hitch 50, with a removable pin 44a to releasably secure the second end portion 36 of the tow bar 30 to the bracket 44. Bracket 44 may be conveniently affixed to an extension 23a of the boot bar 23 as best seen in FIGS. 4B and 5B; however bracket 44 may alternatively be formed integrally into axle mount 50a (not shown) as in the case of bracket 40 (which is not used in the stabilizing position), or with suitable adaptation bracket 44 and bracket 40 may be one and the same. The second end portion 36 thus extends toward the lateral centreline of the trailer beneath the trailer frame, and merges into the first end portion 34 at generally the lateral centre of the trailer 10 such that the first end portion 34 extends beneath the trailer frame along the lateral centreline and forwardly of the boot bar 23 to the stabilizing wheel 48. A retaining bracket 47 is provided at the fourth point of attachment, generally at the centre point of the rear axle 49, to secure the bend 32 in the tow bar 30 against rotating downwardly under the weight of the trailer 10. Optionally a further retaining bracket 46 is provided at a fifth point of attachment near the front of the boot bar 23, optionally with a retaining pin 46a, to prevent the tow bar 30 from shifting laterally along the front of the boot bar 23.

In the embodiment illustrated, in the stabilizing position the first end portion 34 of the tow bar 30 is affixed to a different point of attachment (bracket 40) than the second end portion 36 of the tow bar 30 is affixed when in the towing position (bracket 44), even though both points of attachment are near one of the primary wheels 12. It will be appreciated that both of these points of attachment could be the same and a single bracket could be used for both purposes.

Also, in the embodiment illustrated all couplers for affixing the tow bar 30 to the trailer 10 are shown as brackets formed from any suitable material, for example metal or plastic. This is advantageous because it provides a quick and easy means for releasing the tow bar 30 from the trailer 10 for transport or reversal to the opposite tow bar position. However, any other suitable attachment means may be used to affix the tow bar 30 to the trailer 10, including fasteners, straps and the like, and the invention is not intended to be limited thereby.

In the embodiment illustrated, with the tow bar 30 so secured to the trailer 10 in the stabilizing position a large stabilizing wheel 48 can then be coupled to the first end portion 34, via a releasable pin (not shown) or any other axle-like element, to render the trailer 10 self-supporting. As noted above, if frame is suitably configured it will permit two points of connection between the first end portion 34 and the frame and still allow a clearance for a large stabilizing wheel 48, even if the first end portion 34 does not extend from the intermediate portion 32 at an angle. In either case the second end portion 36 is preferably secured to the chassis 22 at a second connection point forwardly of the wheel 12, to resists shifting due to torsional forces on the tow bar 30 during use. The fabric covering, if any, is provided with suitable openings through which the various brackets are exposed for attachment of the tow bar 30 as described herein.

For use in the towing position, the tow bar 30 is affixed to the trailer by inserting the first end portion 34 into the bracket 40 and inserting removable pin 40a to releasably secure the tow bar 30 to the frame. The first end portion 34 is also inserted into retaining bracket 42 and retained therein by removable pin 42a. The tow hitch 50 can then be secured to the towing vehicle (such as a bicycle, not shown) in conventional fashion, for example by a strap, and the towing vehicle suspends the front of the trailer 10 during use. The couplings 44, 46 and 47 are not used in this orientation of the tow bar 30.

For use in the stabilizing position, for a self-supporting stroller or jogger-type vehicle, the tow bar 30 is affixed to the trailer by inserting the second end portion 36 into the bracket 44 and inserting removable pin 44a to releasably secure the tow bar 30 to the frame. The second end portion 36, preferably at or immediately adjacent to the bend 32, is also inserted into retaining bracket 47 and retained therein by removable pin 47a. The stabilizing wheel 48 can then be rotatably mounted to the first end portion 34, for example by a bolt, pin or any other suitable axle-like member (not shown) fastened to the tow bar 30, and the stabilizing wheel 48 suspends the front of the trailer 10 during use as a stroller or jogger. An optional handle 52 may be affixed to the trailer 10 in any suitable fashion in order to facilitate pushing the trailer 10 in the stroller/jogger mode. The couplings 40 and 42 are not used in this orientation of the tow bar 30.

A preferred embodiment of the present invention having been thus described herein by way of example, it will be appreciated by those skilled in the art that variations may be made thereto without departing from the spirit of the invention as set out in the appended claims.

I claim:

1. A trailer adapted to be supported by a pair of primary wheels in a towing position and by the pair of primary wheels and a stabilizing wheel in a stabilizing position, comprising: a multi-purpose tow bar, comprising a first end portion for coupling to the frame in a towing position and for supporting a stabilizing wheel in a stabilizing position, and a second end portion for coupling to a moving vehicle in the towing position and for coupling to the frame in the stabilizing position, extending from the intermediate portion at an angle, and a frame mounted on the pair of primary wheels, having for affixing the tow bar in a towing position, a first point of attachment adjacent to one of the primary wheels and a second point of attachment generally disposed at a lateral centre of the frame, such that a substantial portion of the first end portion extends generally along a lateral centreline of the frame, and for affixing the tow bar in a stabilizing position, a third point of attachment adjacent to one of the primary wheels and a fourth point of attachment generally disposed near a front end of one side of the frame, such that the second end portion approaches a lateral centreline of the frame from one side, whereby to change from the towing position to the stabilizing position, a direction of the tow bar is reversed and the tow bar is removed from the first and second points of attachment and affixed to the third and fourth points of attachment.

2. The trailer according to claim 1 further comprising, for affixing the tow bar in a stabilizing position, a fifth point of attachment generally centrally disposed along a front portion of a bottom member of the frame.

3. The trailer according to claim 1 in which the first end portion is substantially longer than the second end portion.

4. The trailer according to claim 1 in which the first point of attachment comprises a coupler affixed to the frame adjacent to the primary wheel.

5. The trailer according to claim 3 in which the second point of attachment comprises a coupler affixed to a lowest member of the frame.

6. The trailer according to claim 2 in which the third point of attachment comprises a coupler affixed to the frame adjacent to the primary wheel.

7. The trailer according to claim 6 in which the fourth point of attachment comprises a coupler affixed to an axle supporting the primary wheels.

8. The trailer according to claim 6 in which the coupler is formed integrally with a wheel coupling affixing the one of the primary wheels to an axle supporting the primary wheels.

9. The trailer according to claim 6 in which the second end portion terminates in a tow coupling, and the third point of attachment comprises a bracket adapted to releasably receive the tow coupling.

10. The trailer according to claim 6 in which the first point of attachment and the third point of attachment comprise the same coupler.

11. A kit of parts for a trailer having a frame mounted on a pair of primary wheels, comprising: a multi-purpose tow bar, comprising a first end portion for coupling to the frame in a towing position and for supporting a stabilizing wheel in a stabilizing position, and a second end portion for coupling to a moving vehicle in the towing position and for coupling to the frame in the stabilizing position, extending from the intermediate portion at an angle, and for affixing the tow bar in a towing position, a first coupler for mounting adjacent to one of the primary wheels and a second coupler for mounting generally at a lateral centre of the frame, and for affixing the tow bar in a stabilizing position, a third coupler for mounting adjacent to one of the primary wheels and a fourth coupler for mounting generally near a front end of one side of the frame, whereby a position of the tow bar can be changed from the towing position to the stabilizing position by reversing the tow bar, removing the tow bar from the first and second couplers and affixing the tow bar to the third and fourth couplers.

12. The kit of parts according to claim 11 further comprising, for affixing the tow bar in a stabilizing position, a fifth coupler adapted to be affixed generally centrally along a front portion of a bottom member of the frame.

13. The kit of parts according to claim 11 in which the first end portion is substantially longer than the second end portion.

14. The kit of parts according to claim 11 in which the first coupler is adapted to be affixed to the frame adjacent to the primary wheel.

15. The kit of parts according to claim 14 in which the second coupler is adapted to be affixed to a lowest member of the frame.

16. The kit of parts according to claim 12 in which the third coupler is adapted to be affixed to the frame adjacent to the primary wheel.

17. The kit of parts according to claim 16 in which the fourth coupler is adapted to be affixed to an axle supporting the primary wheels.

18. The kit of parts according to claim 16 in which the coupler is formed integrally with a wheel coupling affixing the one of the primary wheels to an axle supporting the primary wheels.

19. The kit of parts according to claim 16 in which the second end portion terminates in a tow coupling, and the third coupler comprises a bracket adapted to releasably receive the tow coupling.

20. The kit of parts of claim 15 wherein the first coupler and the third coupler comprise the same coupler.

\* \* \* \* \*